United States Patent

Keafer, Jr. et al.

[11] 3,779,788
[45] Dec. 18, 1973

[54] TRANSMITTING AND REFLECTING DIFFUSER

[75] Inventors: Lloyd S. Keafer, Jr., Yorktown; Ernest E. Burcher; Leonard P. Kopia, both of Newport News, all of Va.

[73] Assignee: The United States of America as represented by the Administrator of the National Aeronautics and Space Administration, Washington, D.C.

[22] Filed: Mar. 30, 1972

[21] Appl. No.: 239,803

Related U.S. Application Data

[63] Continuation-in-part of Ser. No. 38,816, May 19, 1970, abandoned.

[52] U.S. Cl............................. 117/33.3, 117/106 A
[51] Int. Cl......................... C23c 13/04, C03c 3/06
[58] Field of Search............... 117/33.3, 106, 46 FS, 117/62; 65/33, 32

[56] References Cited
UNITED STATES PATENTS

| | | | |
|---|---|---|---|
| 3,486,870 | 12/1969 | Vervaart et al. | 65/32 |
| 2,272,342 | 2/1942 | Hyde | 65/33 |
| 2,786,779 | 3/1957 | Long et al. | 117/46 FS |
| 3,423,324 | 1/1969 | Best et al. | 117/106 |

FOREIGN PATENTS OR APPLICATIONS 587,324 11/1959 Canada.......................... 117/46 FS Primary Examiner—Alfred L. Leavitt
Assistant Examiner—J. Massie
Attorney—John R. Manning et al.

[57] ABSTRACT

An ultraviolet grade fused silica substrate is coated with vaporized fused silica. The coating thickness is controlled, one thickness causing ultraviolet light to diffuse and another thickness causing ultraviolet light to reflect a near Lambertian pattern.

4 Claims, 5 Drawing Figures

INVENTORS
LLOYD S. KEAFER, JR.
ERNEST E. BURCHER
LEONARD P. KOPIA

BY

ATTORNEY

TRANSMITTING AND REFLECTING DIFFUSER

CONTINUATION-IN-PART

This application is a continuation-in-part of application Ser. No. 38,816, filed May 19, 1970, now abandoned entitled TRANSMITTING AND REFLECTING DIFFUSER.

ORIGIN OF THE INVENTION

This invention was made by employees of the National Aeronautics and Space Administration and may be manufactured and used by or for the Government for governmental purposes without the payment of any royalties thereon or therefor.

BACKGROUND OF THE INVENTION

This invention relates to the diffusion of ultraviolet light and relates in particular to a method of constructing a near-Lambertian diffuser for transmittance and reflectance of ultraviolet light. A Lambertian diffuser is one which diffuses a point (concentrated beam) source of reflected or transmitted light in a cosine law or circular pattern.

Lambertian diffusers are useful in calibrating instrumentation in the laboratory and for use in optical equipment. The subject invention was first used in the calibration of an optical radiometer.

Although opal glass serves as a near-Lambertian diffuser of visible light, no comparable prior art diffuser has been developed for use in the 2,000–4,000 A ultraviolet range. Absorption in the diffusing layer or scattering out the edge of the diffuser causes the diffusion pattern to deviate from Lambertian. When a thinner diffusing layer is used in an attempt to avoid absorption, a large specular or unscatterd component of the ultraviolet light develops causing deviation from Lambertian.

SUMMARY OF THE INVENTION

The present embodiment of the invention was constructed by vaporizing and condensing ultraviolet grade fused silica in a thin, even layer upon an ultraviolet grade fused silica substrate. The device transmitted a near-Lambertian diffusion pattern of ultraviolet light when the coating thickness was kept thin, a thickness of 20 $\mu$ producing optimum results. The device also reflected diffused ultraviolet light in a near-Lambertian pattern for coating thickness greater than 100 $\mu$. The thin coating for the transmittance diffuser was vitrified with a flame to increase durability. For the reflectance diffuser, metal substrates produced equally good results.

Accordingly, it is an object of the invention to produce a near-Lambertian diffuser of light in the 2,000–4,000 A ultraviolet range.

Another object of the invention is to produce a near-Lambertian diffuser for transmittance of ultraviolet light which gives a diffusion pattern superior to that of opal glass in the visible range.

A further object of the invention is to produce a near-Lambertian diffuser for reflectance of ultraviolet light which is superior to the reflectance of magnesium carbonate and magnesium oxide in the ultraviolet range.

An additional object of the invention is to produce a near-Lambertian diffuser of ultraviolet light which can be simply and cheaply produced in a variety of sizes and shapes.

BRIEF DESCRIPTION OF THE DRAWINGS

A more complete appreciation of the invention and many of the attendant advantages will be better understood by reference to the following detailed description when considered in connection with the accompanying drawings, wherein.

DESCRIPTION OF THE EMBODIMENT

Figure 1:
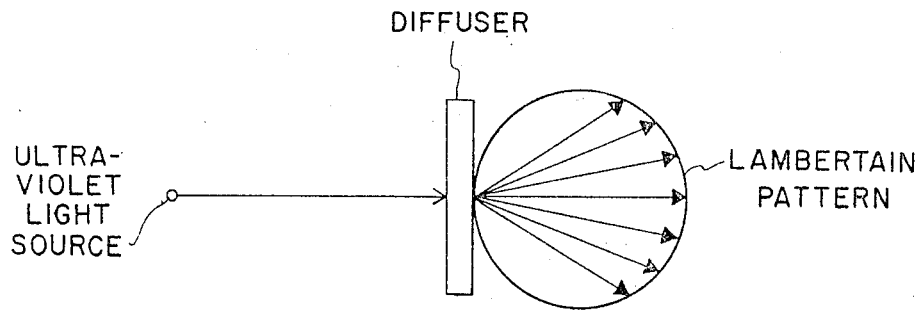
FIG. 1 is a schematic representation of a Lambertian transmitting diffuser in the ultraviolet range, wherein a point (beam) source of ultraviolet light is transmitted and diffused in a circular pattern.
Figure 2:
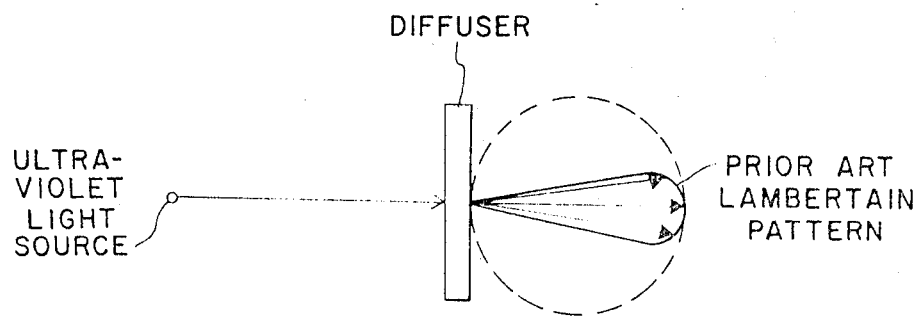
FIG. 2 is a schematic of a diffusion pattern typical of the prior art ultraviolet diffuser with a high specular or non-scattered component.

Referring now more particularly to the drawings, FIG. 1 is a schematic representation of a true Lambertian diffusion of transmitted ultraviolet light. The present invention very nearly obtains this circular diffusion pattern as opposed to the prior art shown in FIG. 2.

Figure 3:
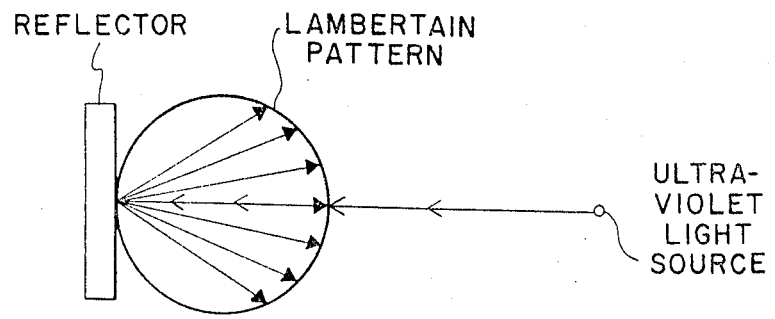
FIG. 3 is a schematic representation of a Lambertian diffuser of reflected ultraviolet light.
Figure 4:
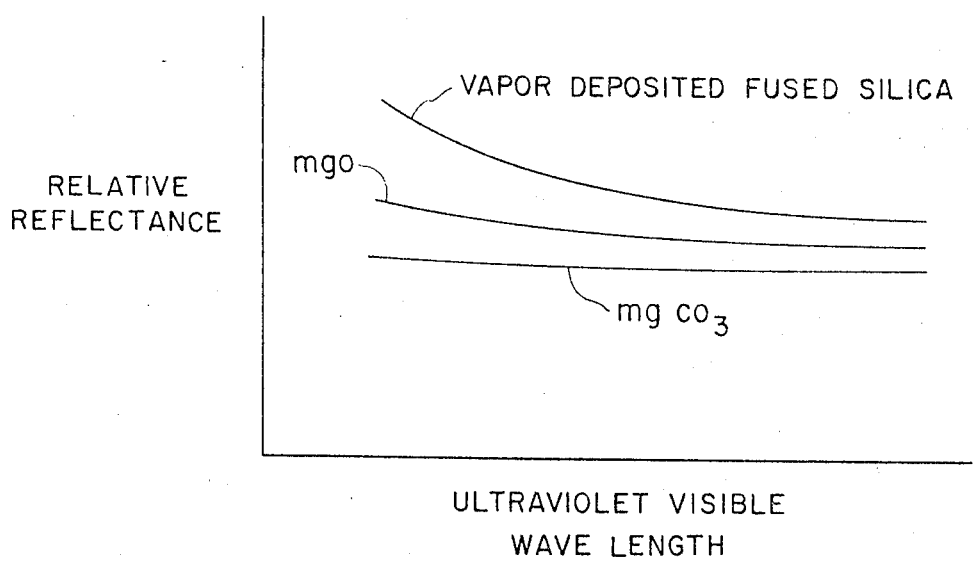
FIG. 4 is a graphic representation comparing the relative reflectance of ultraviolet light by the present invention with that of magnesium oxide and magnesium carbonate.

FIG. 3 is a schematic representation of a true Lambertian diffuser of reflected ultraviolet light. In very nearly achieving this pattern, the present invention has a greater relative reflectance in the ultraviolet range than standard reflectors as shown in FIG. 4.

Figure 5:
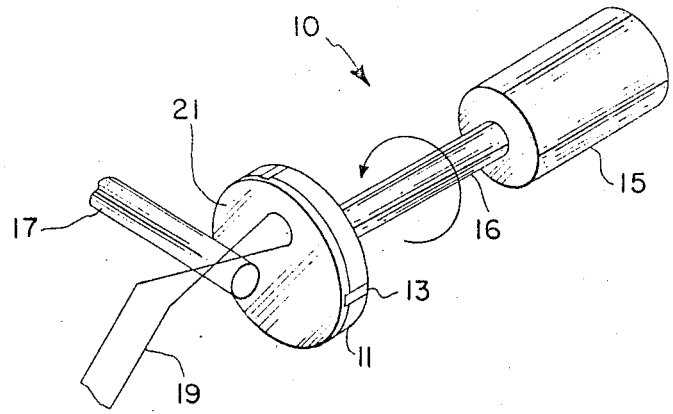
FIG. 5 is a representation of the apparatus and arrangement used to produce the invention, a near-Lambertian diffuser of ultraviolet light.

The apparatus used in constructing the novel diffuser is shown in FIG. 5 and designated generally by the reference numeral 10. An ultraviolet grade fused silica substrate 11 is fixed to the shaft 16 of an electric motor 15 by means of a holder 13. The holder 13 is of conventional design and need not be described in detail. The substrate is so held that the flat surface 21 to be coated is perpendicular to the axis of rotation and facing away from the motor 15. An ultraviolet grade fused silica rod 17 is mounted parallel to the surface to be coated, the axis of the rod passing through the axis of rotation of the substrate. An oxy-acetylene torch 19 is moved back and forth along the rod 17 at a rate calculated to vaporize the fused silica rod 17 so that it is deposited evenly upon the rotating substrate 11 as it condenses. Rod 17 is held at a constant distance from the rotating substrate. This distance is fixed according to the nozzle size and gas pressure of torch 19. Although the method of vaporizing the silica rod by an oxy-acetylene torch is the preferred method of vaporization, it is to be understood that other means of vaporization can be utilized such as induction heating in an inert gas and the use of an infrared laser of the $CO_2$ type.

To produce a near-Lambertian diffuser for transmitting ultraviolet light an ultraviolet grade fused silica substrate 11 is used and the coating thickness is kept to less than 100 $\mu$. An optimum coating thickness was found to be 20 $\mu$ with greater thicknesses excessively degrading transmittance and lesser thicknesses adversely affecting difussion. At the 20 $\mu$ coating thickness, the diffusion pattern of light in the ultraviolet range was very nearly Lambertian. The 20 $\mu$ coating thickness has an average specular transmittance of 0.33 percent between 2,000 and 4,000 A and a totally diffuse transmittance of 1 percent in that range. The coating of the transmitting diffuser may be vitrified to increase durability by playing the flame of torch 19 over the coating until the surface appears slightly glassy.

To produce a near-Lambertian diffuser for reflecting ultraviolet light, any workable metal or solid material may be used as the substrate 11 and the coating thickness is at least 100 $\mu$. The coating of the reflecting diffuser is usually not vitrified.

The device was tested throughout the wavelength range of 2,000–4,000A. A standard monochromator was used as the source. A photomultiplier tube having an S-5 response was used in detecting the boundaries of the diffusion pattern. The detector was movably mounted so as to be positioned within a 140° arc, 70° either side of the projected ultraviolet light line. A second monochromator was used to analyze the ultraviolet light after diffusion, but no fluorescing by the diffuser was noted.

A relative specular transmitter of 0.33 percent was measured by a spectrophotometer. Total diffuse transmittance was obtained by multiplying this value by $\pi$, the diffusion pattern being very nearly Lambertian. Reflectance was also measured with a spectrophotometer for comparison with standard reflectors in the ultraviolet range.

Slow scan, high sensitivity X-ray diffraction tests revealed that the deposited material was non-crystalline. Electron photomicrographs of the condensate revealed a distribution in particle size from 10 A to about 10,000 A with a peak near 500 A. The excellent diffusion properties of the condensate are believed related to the structure of the material and particle size.

As an alternate embodiment of this invention, it may be possible to use another type of transmitter of ultraviolet light such as sapphire as a substrate for the transmitting diffuser. Other combinations and modifications are believed possible and are not to be excluded by this teaching. It is therefore to be understood that within the scope of the appended claims, the invention may be practiced otherwise than as specifically described.

What is claimed as new and desired to be secured by letters Patent of the United States is:

1. A method for the production of a near-Lambertian transmitting diffuser of ultraviolet light comprising the steps of:
   providing an ultraviolet grade fused silica substrate;
   vaporizing ultraviolet grade fused silica material;
   vapor depositing the ultra-violet grade fused silica material evenly upon the substrate to a thickness less than 100 microns, whereby a near Lambertian transmitting diffuser of ultraviolet light is produced.

2. The method of claim 1 including the additional step of hardening the deposited material by heat treatment until the surface is slightly glassy, such heat treatment increasing the durability of the coating.

3. The method of claim 1 whereby the step of vaporizing includes translating heating means along the fused silica material at such a rate that the vaporized material will be condensed evenly upon the substrate.

4. The method of claim 1 including the steps of adapting said substrate to a holding mechanism;
   attaching the holding mechanism to rotational means; rotating the substrate;
   locating the axis of rotation perpendicular to the substrate surface; and wherein the step of
   vaporizing ultraviolet grade fused silica material includes positioning said material parallel to and at a fixed distance from the substrate surface to be coated;
   translating heating means along the length of the fused silica material; and the step of
   depositing of the vaporized material includes producing a coating thickness of 20 mircons.

* * * * *